United States Patent

Anschutz

[15] 3,643,309
[45] Feb. 22, 1972

[54] TOOL ARRANGEMENT FOR A MACHINE TOOL

[72] Inventor: Erhard Anschutz, Plochingen, Germany
[73] Assignee: Feldmuhle Aktiengesellschaft, Dusseldorf, Germany
[22] Filed: June 5, 1970
[21] Appl. No.: 43,811

[30] Foreign Application Priority Data

June 18, 1969 Germany .................... P 19 30 916.1

[52] U.S. Cl. ............................................................. 29/96
[51] Int. Cl. ......................................................... B26d 1/00
[58] Field of Search .................................. 29/96, 97, 95, 98

[56] References Cited

UNITED STATES PATENTS

| | | | |
|---|---|---|---|
| 2,780,856 | 2/1957 | Traycoff | 29/96 |
| 2,449,823 | 9/1948 | Sheridan | 29/96 |
| 3,156,032 | 11/1964 | Lundgren | 29/96 |
| 3,409,964 | 11/1968 | Jessop | 29/96 |
| 3,436,799 | 4/1969 | Kopy | 29/96 |
| 3,456,315 | 7/1969 | Stier | 29/96 |

Primary Examiner—Harrison L. Hinson
Attorney—Kelman and Berman

[57] ABSTRACT

A ceramic, five-sided cutting plate is clamped in a recess of a toolholder in such a manner that two sides of the plate which constitute cutting edges and enclose an angle of 75° are exposed, the other three sides being located in the recess. The two sides contiguously adjacent the cutting edges are backed by faces of the toolholder in the recess which jointly define an angle of 37°. The fifth side of the plate which connects the last-mentioned two sides defines an airgap with the surface of the toolholder. Working stresses applied to the cutting plate in all normal turning operations tend to wedge the plate deeper into the recess of the toolholder, and thus do not cause displacement of the plate.

8 Claims, 2 Drawing Figures

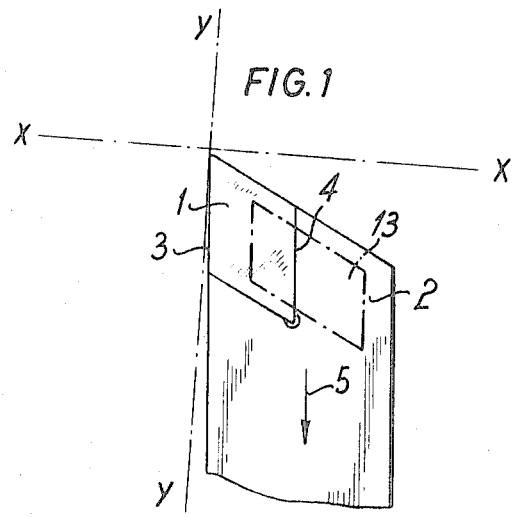
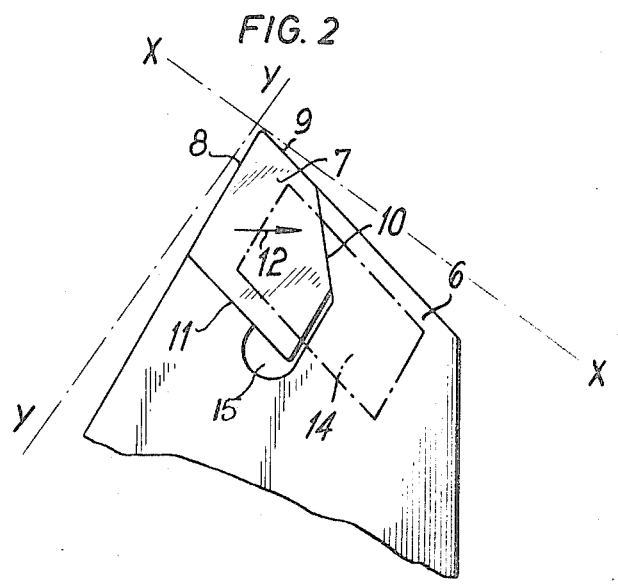
INVENTOR:
Erhard ANSCHÜTZ
By: Kelman and Brennan,
Agents

TOOL ARRANGEMENT FOR A MACHINE TOOL

This invention relates to metal-cutting machine tools, and particularly to a cutting tool arrangement for a copying lathe or like machine tool.

It is known to equip cutting tools for copying lathes with tool bits releasably clamped in a tool holder, the tool bits being plates of approximately rhombic shape, and the cutting edges of each plate meeting at an angle of less than 90°. Such plate-shaped tools are made of sintered aluminum oxide or of carbides. As compared to copying tools in which a tool bit is soldered or brazed to a holder, the clamped cutting plates are less efficient in copying certain shapes, particularly rectangular shoulders. The drawing forces exerted on the tool bit during the copying of shoulders and in similar applications tend to release the tool bit from the tool holder in a direction opposite to the feeding direction. The plate tends to pivot about the point of engagement with the tool holder which is opposite to and farthest removed from the main cutting edge. It is impossible with such a tool arrangement to produce a precise duplicate of a pattern or original.

It has been attempted to seat ceramic or carbide cutting plates more permanently in the associated tool holders by forming the plates with a triangular notch and having a clamping element engage the notch in order to secure the cutting plate against the forces which tend to pull it from the recess of the tool holder during normal operation. It is relatively difficult and costly to provide recesses or notches in the hard, nonmetallic materials which are preferred for plate-shaped cutters, and the recesses or notches materially weaken the plate.

It is a primary object of this invention to provide a tool arrangement of the type described which is free from the shortcomings of the known devices.

More specifically, the invention aims to provide a tool arrangement in which a plate-shaped cutting implement is fixedly, but releasably clamped so as not to change its position under drawing stresses, yet is not weakened by perforations or recesses.

With these objects in view, the invention provides a tool arrangement comprising a cutting tool in the shape of a five-sided or pentagonal, imperforate plate. A first side and a second side of the plate constitute cutting edges of the tool while a third and a fourth side abuttingly engage respective faces of a tool holder in a recess of the latter in which the tool is received. The tool-engaging faces of the toolholder define an angle of less than 45°. The tool is releasably retained in the recess of the tool holder by a clamping device conventional in itself.

Other features, additional objects, and many of the attendant advantages of this invention will readily be appreciated from the following description of a preferred embodiment when considered in connection with the appended drawing in which:

FIG. 1 shows a known cutting tool arrangement for a copying lathe; and

FIG. 2 illustrates an analogous arrangement according to the instant invention.

Referring initially to the prior art device of FIG. 1, there is seen a rhombus or diamond-shaped cutting plate 1 of sintered aluminum oxide which is received in a conforming recess of a toolholder 2 of steel, and retained in the recess by a clamping shoe 13. The main cutting edge 3 is parallel to the backing face 4 of the toolholder 2 in the recess of the latter. When the tool holder moves in the direction of the arrow 5, as during a drawcut, the cutting plate tends to move outward of the recess in the tool holder 2, and cannot be restrained entirely by the clamping shoe 13 so that the workpiece shaped does not obtain the precise intended shape.

In the tool arrangement of the invention illustrated in FIG. 2, the alumina cutting plate 7 is five-sided, having the shape of a rhombus whose one corner has been cut off. The main cutting edge 8 and the secondary cutting edge 9 enclose an angle of 75°. A planar backing face 10 of the toolholder 6 in the recess of the latter abuttingly engages the side of the plate 7 contiguously adjacent the secondary cutting edge, and a backing face 11 of the tool holder similarly engages the face of the cutting plate 7 contiguously adjacent the main cutting edge 8. The backing faces 10, 11 define an angle of 37°. An air gap 15 separates the wall of the toolholder 6 in the recess from the fifth side of the plate 7.

During turning operation longitudinally of the lathe and of the axis of rotation of the workpiece, the toolholder moves in the direction X—X. During a draw cut or facing out, it moves in the direction Y—Y. The forces of reaction acting on the plate 7 in the direction of feeding movement and in the direction of the depth of cut produce a resultant force in the direction of the arrow 12 toward the backing face 10. The cutting plate 7 is not moved outward of the recess in the toolholder, but is wedged more firmly into the recess of the holder without relying entirely on the clamping shoe 14.

It should be understood, of course, that the foregoing disclosure relates only to a preferred embodiment of the invention, and that it is intended to cover all changes and modification of the example of the invention herein chosen for the purpose of the disclosure which do not depart from the spirit and scope of the invention set forth in the appended claims.

What is claimed is:

1. A tool arrangement for a machine tool comprising, in combination:
   a. a tool holder formed with a recess;
   b. a cutting tool having the shape of a five-sided imperforate plate and partly received in said recess,
      1. a first side and a second side of said plate respectively constituting cutting edges of said tool and being contiguously adjacent each other,
      2. a third side and a fourth side having respective portions contiguously adjacent said first and second sides, said portions abuttingly engaging respective faces of said tool holder in said recess, said faces defining an angle of less than 45°; and
   c. clamping means releasably retaining said tool in said recess.

2. A tool arrangement as set forth in claim 6, wherein said first and second sides define an angle of less than 90°.

3. A tool arrangement as set forth in claim 2, wherein the fifth side of said plate connects said third and fourth sides, and is spaced from said toolholder in said recess so as to define an air space with said toolholder.

4. A toolholder arrangement as set forth in claim 3, wherein the angle defined by said first and second sides is substantially greater than 45°.

5. A tool arrangement as set forth in claim 1, wherein said cutting tool essentially consists of carbide or alumina.

6. A tool arrangement as set forth in claim 5, wherein said first, second, third, and fourth sides are planar.

7. A tool arrangement as set forth in claim 6, wherein the fifth side of said plate is planar and connects said third and fourth sides.

8. A tool arrangement as set forth in claim 6, wherein said portions of said third and fourth sides conformingly engage said faces, the engaged parts of said faces being planar.

* * * * *